US012573143B2

(12) United States Patent
Beck et al.

(10) Patent No.:     US 12,573,143 B2
(45) Date of Patent:          Mar. 10, 2026

(54) SYSTEMS AND METHODS FOR IDENTIFYING SUITABILITY OF STORMWATER MANAGEMENT MEASURES USING SPATIAL ANALYSIS

(71) Applicant: 2NDNATURE Software Inc., Santa Cruz, CA (US)

(72) Inventors: Nicole Beck, Santa Cruz, CA (US); Tyler Nodine, Santa Cruz, CA (US); Catherine Riihimaki, Annandale, NJ (US); Gary Conley, Santa Cruz, CA (US); Margaret Mathias, Santa Cruz, CA (US); Nathaniel Evatt, Oceanside, CA (US); Patrick Smyth, Santa Fe, NM (US)

(73) Assignee: 2ndNature Software Inc., Santa Cruz, CA (US)

( * ) Notice: Subject to any disclaimer, the term of this patent is extended or adjusted under 35 U.S.C. 154(b) by 134 days.

(21) Appl. No.: 18/327,742

(22) Filed: Jun. 1, 2023

(65) Prior Publication Data

US 2023/0394761 A1      Dec. 7, 2023

Related U.S. Application Data

(60) Provisional application No. 63/365,767, filed on Jun. 2, 2022.

(51) Int. Cl.
*G06T 17/05*          (2011.01)
*G06Q 50/26*          (2024.01)

(52) U.S. Cl.
CPC ............. *G06T 17/05* (2013.01); *G06Q 50/26* (2013.01)

(58) Field of Classification Search
CPC .................... G06T 17/05; G06Q 50/26; C02F 2103/001; C02F 1/008; E03F 1/00
See application file for complete search history.

(56) References Cited

U.S. PATENT DOCUMENTS 10,482,848 B2 *  11/2019  He ........................... G09G 5/14
10,754,061 B2     8/2020  Beck et al.
(Continued)

OTHER PUBLICATIONS

Diringer SE, Shimabuku M, Cooley H. Economic evaluation of stormwater capture and its multiple benefits in California. PLoS One. Mar. 24, 2020;15(3):e0230549. doi: 10.1371/journal.pone. 0230549. PMID: 32208442; PMCID: PMC7092982. (Year: 2020).*
(Continued)

*Primary Examiner* — Said Broome
*Assistant Examiner* — Jordan Wan Yick
(74) *Attorney, Agent, or Firm* — KPPB LLP

(57)          ABSTRACT

Methods and systems for identifying stormwater management opportunities in accordance with embodiments of the invention are disclosed. In one embodiment of the invention, a method for identifying stormwater management opportunities comprises gathering spatial data for a region; rasterizing the spatial data into a set of raster data layers; forming a plurality of benefit maps using subsets of the set of raster data layers, wherein the plurality of benefit maps corresponds to a plurality of benefit categories; generating an opportunity map by combining a subset of the plurality of benefit maps using weights corresponding to the plurality of benefit categories; and displaying the opportunity map on a user interface.

22 Claims, 8 Drawing Sheets
(4 of 8 Drawing Sheet(s) Filed in Color)

(56) References Cited

U.S. PATENT DOCUMENTS

| | | |
|---|---|---|
| 2005/0273300 A1 | 12/2005 | Patwardhan et al. |
| 2014/0375678 A1* | 12/2014 | Kjeldergaard .......... G06T 17/05 |
| | | 345/629 |
| 2015/0019262 A1 | 1/2015 | Du et al. |
| 2018/0017710 A1 | 1/2018 | Beck et al. |
| 2018/0127286 A1 | 5/2018 | Chung et al. |
| 2019/0324170 A1 | 10/2019 | Beck et al. |
| 2021/0294932 A1* | 9/2021 | Venu ......................... E03F 1/00 |

OTHER PUBLICATIONS

Martijn Kuller, Peter M. Bach, Simon Roberts, Dale Browne, Ana Deletic, A planning-support tool for spatial suitability assessment of green urban stormwater infrastructure, Science of The Total Environment, vol. 686, 2019, pp. 856-868, ISSN 0048-9697. (Year: 2019).*

"BMP RAM: Field Protocols v3.1", 2NDNATURE LLC, Aug. 2016, Retrieved from: http://www.2ndnaturellc.com/wpcontent/uploads/2016/09/BMPRAMFieldProtocols3.1.pdf, 42pgs.

"BMP RAM: Technical Document v3.1", 2NDNATURE LLC, Nov. 2016, Retrieved from: http://www.2ndnaturellc.com/wp-content/uploads/2016/11/BMPRAMv3-1_TechnicalDoc_Nov2016.pdf, 52 pgs.

"BMP RAM: User Guidance v3.2", 2NDNATURE LLC, Mar. 30, 2017, Retrieved from: http://www.2ndnaturellc.com/wpcontent/uploads/2016/09/BMPRAMUserGuidance3.1.pdf, 68 pgs.

"Delineate Urban Catchments: Guidance for Creating Catchment Boundaries and Attributes v3.1", 2NDNATURE LLC, Jul. 2017, Retrieved from: http://www.2ndnaturellc.com/documents/MS4_Mapping_Guidance.pdf, 54 pgs.

"Focused Stormwater Monitoring to Validate Water Quality Source Control and Treatment Assumptions", 2NDNATURE, LLC, Final Technical Report, Mar. 2010, 118 pgs.

"Focused Stormwater Quality Monitoring", 2NDNATURE, LLC, Final Technical Report, Jun. 2012, 149 pgs.

"HEC 19-Hydrology", Federal Highway Administration (FHWA), Design Manual, Report No. FHWA 1P-84-15, 303 pgs. (Presented in 2 Parts).

"Municipal Separate Storm Sewer System (MS4) Main Page", United States Environmental Protection Agency, Retrieved from: http://water.epa.gov/polwaste/npdes/stormwater/Municipal-Separate-Storm-Sewer-System-MS4-Main-Page.cfm, Aug. 2, 2014, 3 pgs.

"Municipal Separate Storm Sewer System Discharge Permit", Maryland Department of the Environment, National Pollutant Discharge Elimination System, Permit No. 11-DP-2215 MD0068292, Dec. 27, 2013, 37.pgs.

"Nutrient and Siltation TMDL Development for Wissahickon Creek, Pennsylvania", U.S. Environmental Protection Agency, Final Report, Oct. 2003, 233 pgs.

"Our Built and Natural Environments: A Technical Review of the Interactions Among Land Use, Transportation, and Environmental Quality", United States Environmental Protection Agency, EPA 231K13001, Second Edition, Jun. 2013, 148 pgs.

"ParcelRAM: Technical and User Guidance Document v1", 2NDNATURE LLC, Aug. 2016, Retrieved from: https://2ntelr.com/parcelram/dist/prod/data/ParcelRAMTechDoc_Web.pdf, 42 pgs.

"Phase I Municipal Stormwater Permit", National Pollutant Discharge Elimination System and State Waste Discharge General Permit for Discharges from Large and Medium Municipal Separate Storm Sewer Systems, State of Washington Department of Ecology, Aug. 1, 2013, 75 pgs.

"Pollutant Load Reduction Model (PLRM)", Northwest Hydraulic Consultants, Inc. Geosyntec Consultants, Inc. 2NDNATURE, LLC, Model Development Document, Oct. 2009, 163 pgs.

"Pollutant Load Reduction Model Quick Start Guide", Northwest Hydraulic Consultants, Inc. Geosyntec Consultants, Inc. 2NDNATURE, LLC, Version 2.1, Feb. 2015, 21 pgs.

"Stormwater Tool to Estimate Load Reductions: Final Technical Document v1.1", 2NDNATURE LLC, Mar. 2017, Retrieved from: http://www.2ndnaturellc.com/documents/swTELR_TechDoc.pdf, 141 pgs.

"Time of Concentration", United States Department of Agriculture, Part 630 Hydrology National Engineering Handbook, 210-VI-NEH, Chapter 15, May 2010, 29 pgs.

"Urban Catchment Monitoring to Evaluate Tahoe TMDL Tools", 2NDNATURE, LLC, Final Technical Report, Jun. 2014, 127 pgs.

"Urban Hydrology for Small Watersheds", United States Department of Agriculture, Technical Release 55, Jun. 1986, 81 pgs.

"User's Guide Spreadsheet Tool for the Estimation of Pollutant Load (STEPL)", Version 4.1, Tetra Tech, Inc. Mar. 2011, Available at: http://it.tetratech-ffx.com/steplweb, 90 pgs.

"Waste Discharge Requirements (WDRs) For Storm Water Discharges from Small Municipal Separate Storm Sewer Systems (Ms4s) (General Permit)", California State Water Resources Control Board, Water Quality Order No. 2013-0001-DWQ, National Pollutant Discharge Elimination System (NPDES), General Permit No. CAS000004, Feb. 5, 2013, 105 pgs.

Ahiablame et al., "Effectiveness of Low Impact Development Practices: Literature Review and Suggestions for Future Research", Water, Air, & Soil Pollution, vol. 223, No. 7, 2012, pp. 4253-4273, doi: 10.1007/s11270-012-1189-2.

Arnold Jr. et al., "Impervious Surface Coverage: The Emergence of a Key Environmental Indicator", Journal of the American Planning Association, vol. 62, No. 2, Spring 1996, pp. 243-258, 10.1080/01944369608975688.

Atchison et al., "Recarga User's Manual Version 2.3", Retrieved from: http://https://dnr.wisconsin.gov/topic/Stormwater/standards/recarga.html (Accessed in Apr. 2016), 19 pgs.

Beck et al., "An urban runoff model designed to inform stormwater management decisions", Journal of Environmental Management, vol. 193, May 15, 2017, pp. 257-269, doi: 10.1016/j.jenvman.2017.02.007.

Bedan et al., "Stormwater Runoff Quality and Quantity From Traditional and Low Impact Development Watersheds", Journal of the American Water Resources Association, vol. 45, No. 4, Aug. 2009, pp. 998-1008, doi: 10.1111/j.1752-1688.2009.00342.x.

Beven, "Changing Ideas in Hydrology—The Case of Physically-Based Models", Journal of Hydrology, vol. 105, No. 1-2, Jan. 1989, pp. 157-172, doi: 10.1016/0022-1694(89)90101-7.

Beven, "Rainfall-Runoff Modelling: The Primer", Wiley, First Edition, Apr. 16, 2001, 360 pgs.

Beven et al., "A guide to good practice in modeling semantics for authors and referees", Water Resources Research, vol. 49, No. 8, Aug. 2013, pp. 5092-5098, doi: 10.1002/wrcr.20393.

Bhaduri et al., "Assessing Watershed-Scale, Long-Term Hydrologic Impacts of Land-Use Change Using a GIS-NPS Model", Environmental Management, vol. 26, No. 6, 2000, pp. 643-658, doi: 10.1007/s002670010122.

Bicknell et al., "Hydrological Simulation Program—Fortran User's Manual for Version 11", United States Environmental Protection Agency, National Exposure Research Laboratory, EPA/600/SR-97/080, Aug. 1997, 2 pgs.

Bormann et al., "Possibilities and limitations of regional hydrological models applied within an environmental change study in Benin (West Africa)", Physics and Chemistry of the Earth, vol. 28, No. 33-36, 2003, pp. 1323-1332, doi: 10.1016/j.pce.2003.09.008.

Brander et al., "Modeled Impacts of Development Type on Runoff Volume and Infiltration Performance", Journal of the American Water Resources Association, vol. 40, No. 4, Aug. 2004, pp. 961-970, doi: 10.1111/j.1752-1688.2004.tb01059.x.

Brezonik et al., "Analysis and predictive models of stormwater runoff volumes, loads, and pollutant concentrations from watersheds in the Twin Cities metropolitan area, Minnesota, USA", Water Research, vol. 36, No. 7, Apr. 2002, pp. 1743-1757, doi: 10.1016/S0043-1354(01)00375-X.

Chandler et al., "Estimating Annual Urban Nonpoint Pollutant Loads", Journal of Management in Engineering, vol. 10, No. 6, Nov. 1, 1994, pp. 50-59, doi: 10.1061/(ASCE)9742-597X(1994)10:6(50).

(56) References Cited

OTHER PUBLICATIONS

Dotto et al., "Comparison of different uncertainty techniques in urban stormwater quantity and quality modelling", Water Research, vol. 46, No. 8, May 15, 2012, pp. 2545-2558, doi: 10.1016/j.watres. 2012.02.009.

Dotto et al., "Impacts of measured data uncertainty on urban stormwater models", Journal of Hydrology, vol. 508, Jan. 16, 2014, pp. 28-42, doi: 10.1016/j.jhydrol.2013.10.025.

Elliott et al., "A review of models for low impact urban stormwater drainage", Environmental Modelling & Software, vol. 22, No. 3, Mar. 3, 2006, pp. 394-405, doi: 10.1016/j.envsoft.2005.12.005.

Freni et al., "Assessment of the integrated urban water quality model complexity through identifiability analysis", Water Research, vol. 45, No. 1, Jan. 2011, pp. 37-50, doi: 10.1016/j.watres.2010.08. 004.

Fry et al., "Identifying streamgage networks for maximizing the effectiveness of regional water balance modeling", Water Resources Research, vol. 49, No. 5, May 2013, pp. 2689-2700, doi: 10.1002/wrcr.20233.

Gaume et al., "Uncertainty assessment and analysis of the calibrated parameter values of an urban storm water quality model", Journal of Hydrology, vol. 210, No. 1-4, Sep. 1998, pp. 38-50, doi: 10.1016/S0022-1694(98)00171-1.

Gilroy et al., "Spatio-temporal effects of low impact development practices", Journal of Hydrology, vol. 367, No. 3-4, Apr. 15, 2009, pp. 228-236, doi: 10.1016/j.jhydrol.2009.01.008.

Gove et al., "Effects of Scale on Land Use and Water Quality Relationships: A Longitudinal Basin-Wide Perspective", Journal of the American Water Resources Association, vol. 37, No. 6, Dec. 2001, pp. 1721-1734, doi: 10.1111/j.1752-1688.2001.tb03672.x.

Harbor, "A Practical Method for Estimating the Impact of Land-Use Change on Surface Runoff, Groundwater Recharge and Wetland Hydrology", Journal of the American Planning Association, vol. 60, No. 1, 1994, pp. 95-108, doi: 10.1080/01944369408975555.

Harmel et al., "Cumulative Uncertainty in Measured Streamflow and Water Quality Data for Small Watersheds", Transactions of the American Society of Agricultural and Biological Engineers, vol. 49, No. 3, 2006, pp. 689-701, doi: 10.13031/2013.20488.

Hawkins et al., "Runoff Curve Number Method: Examination of the Initial Abstraction Ratio", Proceedings of the Second Federal Interagency Hydrologic Modeling Conference, Las Vegas, Nevada. U.S. Geological Survey, Lakewood, Colorado, 2002, CD-ROM, 16 pgs. doi: 10.1061/40685(2003)308.

Heaney et al., "Storm Water Management Model: Level 1—Preliminary Screening Procedures", Environmental Protection Technology Series, EPA-600/2-76-275, Project No. R-802411, Oct. 1976, 94 pgs.

Holman-Dodds et al., "Evaluation of Hydrologic Benefits of Infiltration Based Urban Storm Water Management", Journal of the American Water Resources Association, vol. 39, No. 1, Feb. 2003, pp. 205-215, doi: 10.1111/j.1752-1688.2003.tb01572.x.

Hossain et al., "Advances in Landscape Runoff Water Quality Modelling: A Review", Landscape Dynamics, Soils and Hydrological Processes in Varied Climates, Chapter 12, Jul. 22, 2015, pp. 225-257, doi: 10.1007/978-3-319-18787-7_12.

Jakeman et al., "How Much Complexity is Warranted in a Rainfall-Runoff Model?", Water Resources Research, vol. 29, No. 8, Aug. 1993, pp. 2637-2649, doi: 10.1029/93wr00877.

Jiang, "Investigation of Runoff Curve Number Initial Abstraction Ratio", University of Arizona, Thesis, 2001, 120 pgs.

Karr, "Defining and measuring river health", Freshwater Biology, vol. 41, No. 2, Mar. 1999, pp. 221-234, doi: 10.1046/j.1365-2427. 1999.00427.x.

Kokkonen et al., "A comparison of metric and conceptual approaches in rainfall-runoff modeling and its implications", Water Resources Research, vol. 37, No. 9, Sep. 2001, pp. 2345-2352, doi: 10.1029/2001WR000299.

Leavesley et al., "A modular approach to addressing model design, scale, and parameter estimation issues in distributed hydrological modelling", Hydrological Processes, vol. 16, Feb. 15, 2002, pp. 173-187, doi: 10.1002/hyp.344.

Lee et al., "A watershed-scale design optimization model for stormwater best management practices", Environmental Modelling & Software, vol. 37, Nov. 2012, pp. 6-18, doi: 10.1016/j.envsoft. 2012.04.011.

Lee et al., "Characterization of urban stormwater runoff", Water Research, vol. 34, No. 6, Apr. 1, 2000, pp. 1773-1780, doi: 10.1016/s0043-1354(99)00325-5.

Li et al., "Sensitivity Analysis for Urban Drainage Modeling Using Mutual Information", Entropy, vol. 16, No. 11, Nov. 3, 2014, pp. 5738-5752, doi: 10.3390/e16115738.

Lim et al., "Effects of Initial Abstraction and Urbanization on Estimated Runoff Using CN Technology", Journal of the American Water Resources Association, vol. 42, No. 3, Jun. 2006, pp. 629-643, doi: 10.1111/j.1752-1688.2006.tb04481.x.

Lindenschmidt, "The effect of complexity on parameter sensitivity and model uncertainty in river water quality modelling", Ecological Modelling, vol. 190, No. 1-2, Jan. 10, 2006, pp. 72-86, doi: 10.1016/j.ecolmodel.2005.04.016.

Maheepala et al., "Hydrological data monitoring for urban stormwater drainage systems", Journal of Hydrology, vol. 245, No. 1-4, May 1, 2001, pp. 32-47, doi: 10.1016/S0022-1694(01)00342-0.

Mathevet et al., "A bounded version of the Nash-Sutcliffe criterion for better model assessment on large sets of basins", Large Sample Basin Experiments for Hydrological Model Parameterization: Results of the Hydrological Model Parameter Experiment, IAHS Publication 307, 2006, pp. 211-219.

Meals et al., "Lag Time in Water Quality Response to Best Management Practices: A Review", Journal of Environmental Quality Abstract, vol. 39, No. 1, Jan. 2010, pp. 85-96, doi: 10.2134/jeq2009. 0108.

Michel et al., "Soil Conservation Service Curve Number method: How to mend a wrong soil moisture accounting procedure?", Water Resources Research, vol. 41, No. W02011, Feb. 12, 2005, 6 pgs. doi:10.1029/2004WR003191.

Nandakumar et al., "Uncertainty in rainfall—runoff model simulations and the implications for predicting the hydrologic effects of land-use change", Journal of Hydrology, vol. 192, No. 1-4, May 1997, pp. 211-232, doi: 10.1016/S0022-1694(96)03106-X.

Nash et al., "River Flow Forecasting Through Conceptual Models Part I—A Discussion of Principles", Journal of Hydrology, vol. 10, No. 3, Apr. 1970, pp. 282-290, doi: 10.1016/0022-1694(70)90255-6.

National Research Council, "Urban Stormwater Management in the United States", National Academies Press, Mar. 17, 2009, Available at: http://www.nap.edu/catalog.php?record_id=12465, 611 pgs. (Presented in 2 Parts).

Perrin et al., "Does a large number of parameters enhance model performance? Comparative assessment of common catchment model structures on 429 catchments", Journal of Hydrology, vol. 242, No. 3-4, Feb. 28, 2001, pp. 275-301, doi: 10.1016/S0022-1694(00)00393-0.

Petrucci et al., "The dilemma of spatial representation for urban hydrology semi-distributed modelling: trade-offs among complexity, calibration and geographical data", Journal of Hydrology, vol. 517, Sep. 19, 2014, pp. 997-1007, doi: 10.1016/j.jhydrol.2014.06. 019.

Rauch et al., "Deterministic modelling of integrated urban drainage systems", Water Science and Technology, vol. 45, No. 3, 2002, pp. 81-94, doi: 10.2166/wst.2002.0059.

Reed et al., "Overall distributed model intercomparison project results", Journal of Hydrology, vol. 298, No. 1-4, Oct. 1, 2004, pp. 27-60, doi: 10.1016/j.jhydrol.2004.03.031.

Rode et al., "Uncertainties in selected river water quality data", Hydrology and Earth System Sciences, vol. 11, No. 2, Feb. 13, 2007, pp. 863-874, doi: 10.5194/hess-11-863-2007.

Rossman, "National Stormwater Calculator User's Guide", Environmental Protection Agency, EPA/600/R-13/085, Jul. 2013, 60 pgs.

(56)        References Cited

OTHER PUBLICATIONS

Rossman, "Storm Water Management Model—User's Manual Version 5.0", U.S. Environmental Protection Agency, EPA/600/R-05/040, 2008, Revised: Jul. 2010, 295 pgs.

Schaefli et al., "Do Nash values have value?", Hydrological Processes, vol. 21, No. 15, Jul. 15, 2007, pp. 2075-2080, doi: 10.1002/hyp.6825.

Schueler, "Controlling Urban Runoff: A Practical Manual for Planning and Designing Urban BMPs", Metropolitan Washington Council of Governments, Department of Environmental Programs, Jul. 1987, 227 pgs.

Schuster et al., "Evaluation of Water Quality Projects in the Lake Tahoe Basin", Environmental Monitoring and Assessment, vol. 90, No. 1-3, Jan. 2004, pp. 225-242, doi: 10.1023/b:emas.0000003591.52435.8d.

Shi et al., "Research on the SCS-CN initial abstraction ratio using rainfall-runoff event analysis in the Three Gorges Area, China", Catena, vol. 77, No. 1, Apr. 15, 2009, pp. 1-7, doi: 10.1016/j.catena.2008.11.006.

Snowling et al., "Evaluating modelling uncertainty for model selection", Ecological Modelling, vol. 138, No. 1-3, Mar. 15, 2001, pp. 17-30, doi: 10.1016/S0304-3800(00)00390-2.

Tang et al., "Forecasting land use change and its environmental impact at a watershed scale", Journal of Environmental Management, vol. 76, No. 1, Jul. 2005, pp. 35-45, doi: 10.1016/j.jenvman.2005.01.006.

Tomer et al., "The challenge of documenting water quality benefits of conservation practices: a review of USDA-ARS's conservation effects assessment project watershed studies", Water Science & Technology, vol. 64, No. 1, Jul. 2011, pp. 300-310, doi: 10.2166/wst.2011.555.

Voskamp et al., "Planning support system for climate adaptation: Composing effective sets of blue-green measures to reduce urban vulnerability to extreme weather events", Building and Environment, vol. 83, Jan. 2015, pp. 159-167, doi: 10.1016/j.buildenv.2014.07.018.

Walsh et al., "Principles for urban stormwater management to protect stream ecosystems", Freshwater Science, vol. 35, No. 1, Mar. 2016, 14 pgs. doi: 10.1086/685284.

Xian et al., "Change of Impervious Surface Area between 2001 and 2006 in the Conterminous United States", Photogrammetric Engineering and Remote Sensing, vol. 77, No. 8, 2011, pp. 758-762.

Zoppou, "Review of urban storm water models", Environmental Modelling & Software, vol. 16, No. 3, Apr. 2001, pp. 195-231, doi: 10.1016/S1364-8152(00)00084-0.

* cited by examiner

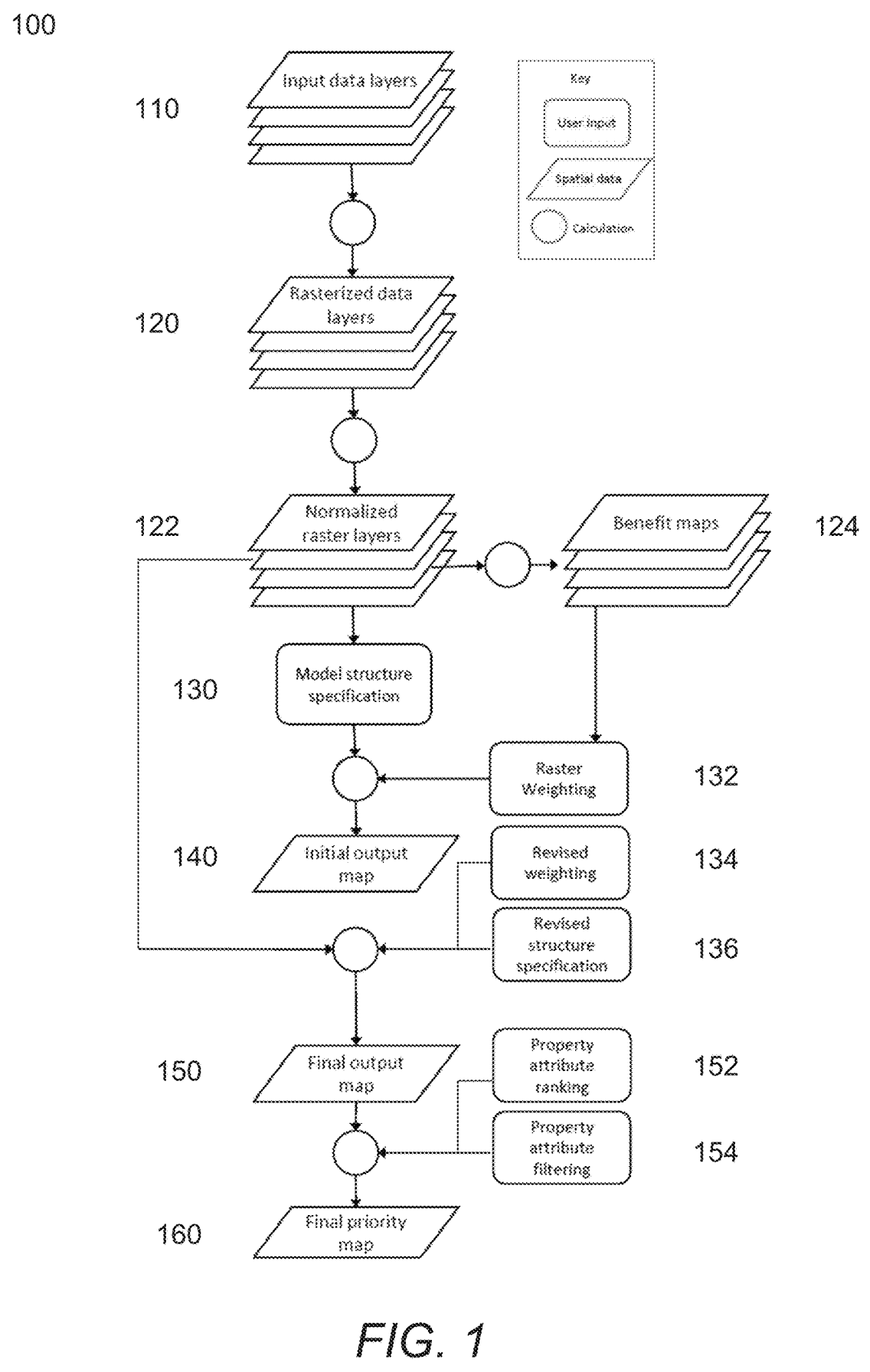

100

110    input data layers

Key

User input

Spatial data

Calculation

120    Rasterized data layers

122    Normalized raster layers

Benefit maps    124

130    Model structure specification

Raster Weighting    132

140    Initial output map

Revised weighting    134

Revised structure specification    136

150    Final output map

Property attribute ranking    152

Property attribute filtering    154

160    Final priority map

*FIG. 1*

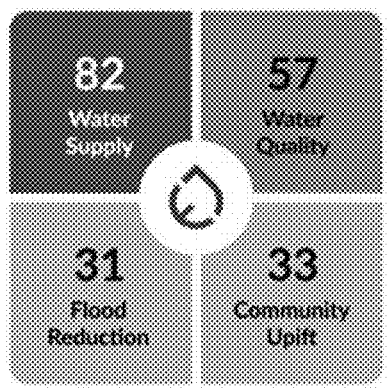
78103
Rank: 6 out of 48 properties    ( Selected )
E.J. Community: Yes
Address: 240 Mantua Grove Road, Paulsboro, NJ
Focus Tenant: Amazon
*FIG. 2.1*
*FIG. 2.2*

Spatial Data
810

Specified
Model Structure
820

Specified
Weights
830

Stormwater Projects Identification Application
800

Data Rasterization Module
840

Data Normalization Module
850

Benefit Scores and
Interim Map Generator
860

Opportunity Scores and
Output Map Generator
880

SYSTEMS AND METHODS FOR IDENTIFYING SUITABILITY OF STORMWATER MANAGEMENT MEASURES USING SPATIAL ANALYSIS

CROSS-REFERENCE TO RELATED APPLICATION(S)

The current application claims priority to U.S. Provisional Patent Application Ser. No. 63/365,767 entitled "Systems and Methods for Identifying Suitability of Stormwater Management Measures Using Spatial Analysis," filed Jun. 2, 2022, the disclosure of which is herein incorporated by reference in its entirety.

FIELD OF THE INVENTION

This invention generally relates to opportunities and constraints for the implementation of projects to reduce impacts of stormwater runoff. More particularly, this invention relates to the identification of suitable stormwater management measures using spatial analysis.

BACKGROUND

Stormwater from precipitation such as rain or snowfall can soak into soil and become groundwater, or flow over surfaces to form runoff. While natural landscapes contain soils and plants that largely absorb stormwater, developed areas incorporate more impervious surfaces, such as paved roads, parking lots, building rooftops and more compacted soil, that prevent rain from infiltrating into the ground. The resulting stormwater runoff generated in these developed areas can cause a multitude of issues.

Stormwater runoff can pick up pollutants such as trash, chemicals, and dirt from various sources including construction sites, lawns, improperly stored hazardous wastes, and illegal dumping. These pollutants are then carried by the runoff into streams, lakes, rivers and groundwater, impacting wildlife habitats and the integrity of the environment. In addition, stormwater runoff in a city can have various consequences such as flooding or poor water quality in the community and surrounding areas.

In order to counteract these impacts of stormwater runoff, municipalities have adopted regulations requiring the management of stormwater. Communities can employ a combination of various practices to control, reduce, detain, or remove pollutants from stormwater runoff.

SUMMARY OF THE INVENTION

Systems and methods for identifying suitability of stormwater management measures using spatial analysis, in accordance with various embodiments of the invention, are disclosed.

A method for identifying stormwater management opportunities, in one embodiment of the invention, comprises gathering spatial data for a region; rasterizing the spatial data into a set of raster data layers; forming a plurality of benefit maps using subsets of the set of raster data layers, wherein the plurality of benefit maps corresponds to a plurality of benefit categories; generating an opportunity map by combining a subset of the plurality of benefit maps using weights corresponding to the plurality of benefit categories; and displaying the opportunity map on a user interface.

In a further embodiment, the method further comprises normalizing the set of raster data layers.

In another embodiment, the spatial data includes data of at least one data type selected from the group consisting of vector data and raster data.

In a yet further embodiment, the spatial data relates to at least one data category selected from the group consisting of stormwater pollution, drainage distance to impaired waterbody, water pollution risk, trash priority land use area, stormwater runoff, drought risk, groundwater basin, soil infiltration capacity, hydrologic soil type, area of imperviousness, local flooding frequency, historical precipitation, projected change in precipitation, biodiversity, urban heat island condition, current greenness level, community socioeconomic status, park proximity, and public exposure.

In another embodiment, the plurality of benefit categories includes at least one benefit category selected from the group consisting of runoff reductions, water quality improvements, urban greening, community enhancement, natural habitat protection, water supply resilience, flood risk protection, urban temperature reductions, and climate change mitigation.

In yet another embodiment, the opportunity map identifies an opportunity score for a portion of the region, the opportunity score indicating a potential benefit resulting from implementation of a stormwater management measure related to the portion of the region.

In still another embodiment, the weights are specified by a user.

In a still further embodiment, the method further comprises synthesizing multiple raster data layers from the set of raster data layers to form a synthesized raster data layer; and adding the synthesized raster data layer to the set of raster data layers.

In a yet further embodiment, generating the opportunity map is further performed by combining the subset of the plurality of benefit maps using a model structure.

In yet another embodiment, the model structure is specified by a user.

In another further embodiment, generating the opportunity map is further performed by joining the combined subset of the plurality of benefit maps with at least one supplemental data layer selected from the group consisting of a parcel data layer and a road data layer.

A system for identifying stormwater management opportunities, in still another further embodiment of the invention, comprises a processor; and a memory containing an application for identifying stormwater management opportunities, wherein execution of the application directs the processor to gather spatial data for a region; rasterize the spatial data into a set of raster data layers; form a plurality of benefit maps using subsets of the set of raster data layers, wherein the plurality of benefit maps corresponds to a plurality of benefit categories; generate an opportunity map by combining a subset of the plurality of benefit maps using weights corresponding to the plurality of benefit categories; and display the opportunity map on a user interface.

In a still yet further embodiment, execution of the application further directs the processor to normalize the set of raster data layers.

In still yet another embodiment, the spatial data includes data of at least one data type selected from the group consisting of vector data and raster data.

In a still further embodiment again, the spatial data relates to at least one data category selected from the group consisting of stormwater pollution, drainage distance to impaired waterbody, water pollution risk, trash priority land use area, stormwater runoff, drought risk, groundwater basin, soil infiltration capacity, hydrologic soil type, area of imperviousness, local flooding frequency, historical precipitation, projected change in precipitation, biodiversity, urban heat island condition, current greenness level, community socioeconomic status, park proximity, and public exposure.

In still another embodiment again, the plurality of benefit categories includes at least one benefit category selected from the group consisting of runoff reductions, water quality improvements, urban greening, community enhancement, natural habitat protection, water supply resilience, flood risk protection, urban temperature reductions, and climate change mitigation.

In a yet further embodiment, the opportunity map identifies an opportunity score for a portion of the region, the opportunity score indicating a potential benefit resulting from implementation of a stormwater management measure related to the portion of the region.

In another further embodiment, the weights are specified by a user.

In still another embodiment, execution of the application further directs the processor to synthesize multiple raster data layers from the set of raster data layers to form a synthesized raster data layer; and add the synthesized raster data layer to the set of raster data layers.

In still yet another embodiment, generating the opportunity map is further performed by combining the subset of the plurality of benefit maps using a model structure.

In a still further embodiment, the model structure is specified by a user.

In a yet further embodiment, generating the opportunity map is further performed by joining the combined subset of the plurality of benefit maps with at least one supplemental data layer selected from the group consisting of a parcel data layer and a road data layer.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The description and claims will be more fully understood with reference to the following figures and data graphs, which are presented as exemplary embodiments of the invention and should not be construed as a complete recitation of the scope of the invention.

FIG. 1 is a diagram illustrating the data flow for a method for identifying stormwater management opportunities in accordance with an embodiment of the invention.

FIGS. 2.1-2.2 show examples of benefit scores.

DETAILED DESCRIPTION

Figure 2:
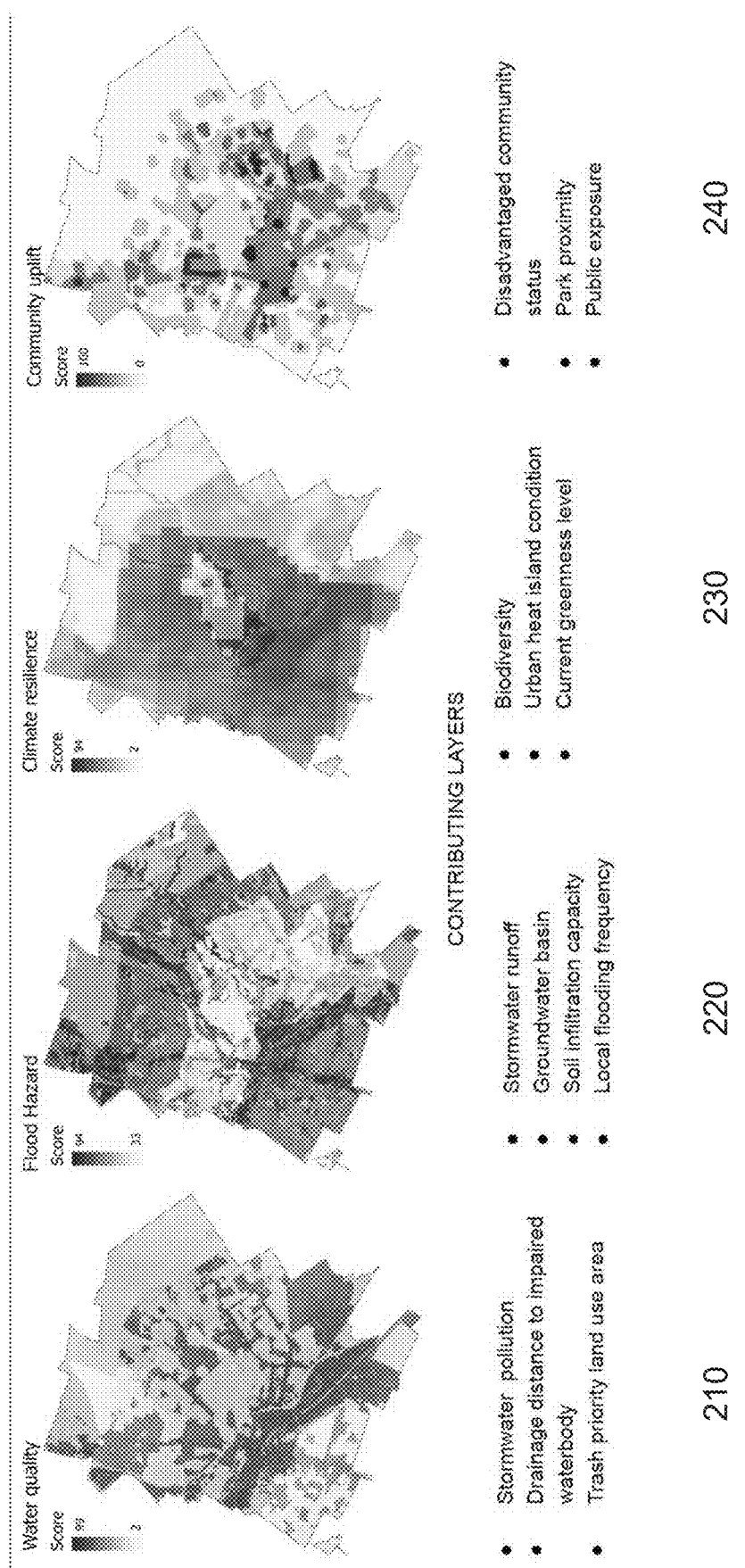
FIG. 2 includes examples of interim benefit maps corresponding to benefit categories in accordance with an embodiment of the invention.

Turning now to the drawings, methods and systems for identifying suitability of stormwater management measures using spatial analysis in accordance with various embodiments of the invention are illustrated. With respect to a given community, there are often a number of potential stormwater management practices that may be implemented. In selecting stormwater management projects for implementation, also referred to as stormwater control measures or Best Management Practices (BMPs), many pre-existing characteristics of the relevant region may be considered. In addition, while certain stormwater management projects may result in particular benefits within a region, the importance of those benefits to the community can depend on the community's priorities.

For example, certain communities that withdraw significant amounts of water for agricultural use may face water supply limitations, so replenishing the groundwater supply is a priority. On the other hand, areas with abundant rainfall but degraded streams resulting from polluted urban drainages may prioritize, for example, the removal of pollutants from stormwater or the creation of green space. Thus, in order to identify projects that result in benefits well-suited to a particular community, various factors should be taken into consideration.

The analysis involved in a stormwater management planning exercise can therefore be cumbersome and inefficient, requiring the manual review of spatial data and identification of patterns and factors in order to make decisions to prioritize, for example, one location or project over another. This type of process can be not only inefficient, but also potentially inaccurate in identifying projects with maximum benefit potential in a region. An automated process or system to perform such analyses would therefore greatly improve efficiency in stormwater planning, benefitting both municipalities and their surrounding environments.

In many embodiments of the invention, stormwater information management and/or project identification methods and systems enable corporations to prioritize, integrate, and track the impacts of stormwater resiliency investments in their Environmental, Social and Governance (ESG) programs. Corporate sustainability officers and other users can determine where rain management projects will have the greatest sustainability benefits, quantify the potential impacts of the stormwater treatment, estimate capital costs and cost recovery, and visualize the results of stormwater better managed.

In certain embodiments of the invention, a consistent scalable national multi-benefit screening tool can be implemented to incorporate community multi-benefits in regional watershed planning efforts. Such a screening tool can employ methodologies and supporting national datasets to screen properties' relative environmental impact based on user-defined weighting of multiple critical benefits that investments in stormwater resiliency can deliver, such as but not limited to water quality, water supply, flood reduction, and community uplift. Beyond the total stormwater volume and pollution potential, the geographic context of each property can thus be used to determine the relative local and regional multi-benefits that resilient stormwater management can deliver.

FIG. 1 illustrates the data flow 100 for performing a stormwater project identification method in accordance with an embodiment of the invention. In FIG. 1, input data layers 110 including spatial data for a region are gathered from one or more of various sources, such as but not limited to nationwide organizations. In certain embodiments, the data is extracted to a property table. The data layers are rasterized 120 and normalized 122 if necessary. In some embodiments of the invention, selected individual raster data layers (such as but not limited to those representing data categories in the bullet points of FIG. 2) can be synthesized into a new data layer. Newly synthesized data layers can be displayed as benefit maps 124, such as maps 210/220/230/240 shown in FIG. 2, corresponding to various benefit categories. Alternatively or additionally, synthesized data layers can be combined with other synthesized or individual data layers to form benefit maps. In some embodiments of the invention, benefit scores are calculated for the benefit maps, where the scores indicate, for various portions of a given region, the opportunity for improvement within the single benefit category corresponding to each map. In certain embodiments of the invention, the rasterized data may be used to calculated scores for each benefit category independently of any synthesized benefit maps.

In a number of embodiments, a subset of the individual and/or synthesized normalized raster data layers are combined based on a determined model structure 130 and raster weights 132 to generate an initial output map 140. This initial output map shows opportunity scores for different portions of a given region, where an opportunity score indicates the estimated benefit potential of implementing certain stormwater management projects, taking into account the characteristics of the area (as represented by the spatial data) along with the importance of the benefits to the community (as represented by the raster weights). The model structure and weights can be determined by system default and/or by user specification.

Figure 3:
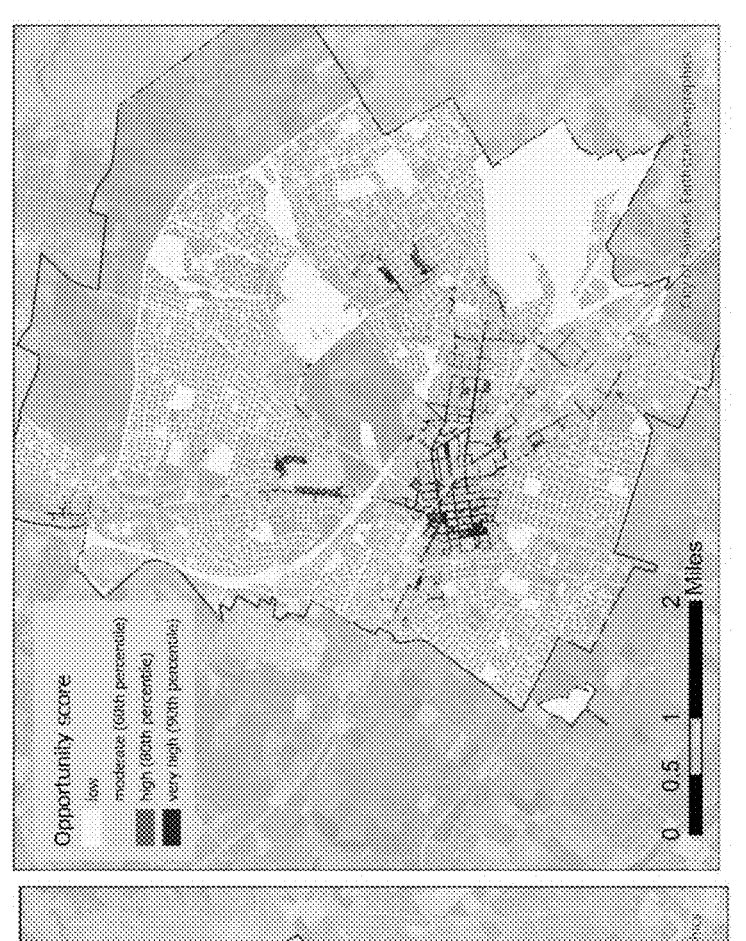
FIG. 3 includes examples of opportunity maps in accordance with an embodiment of the invention.
Figure 3:
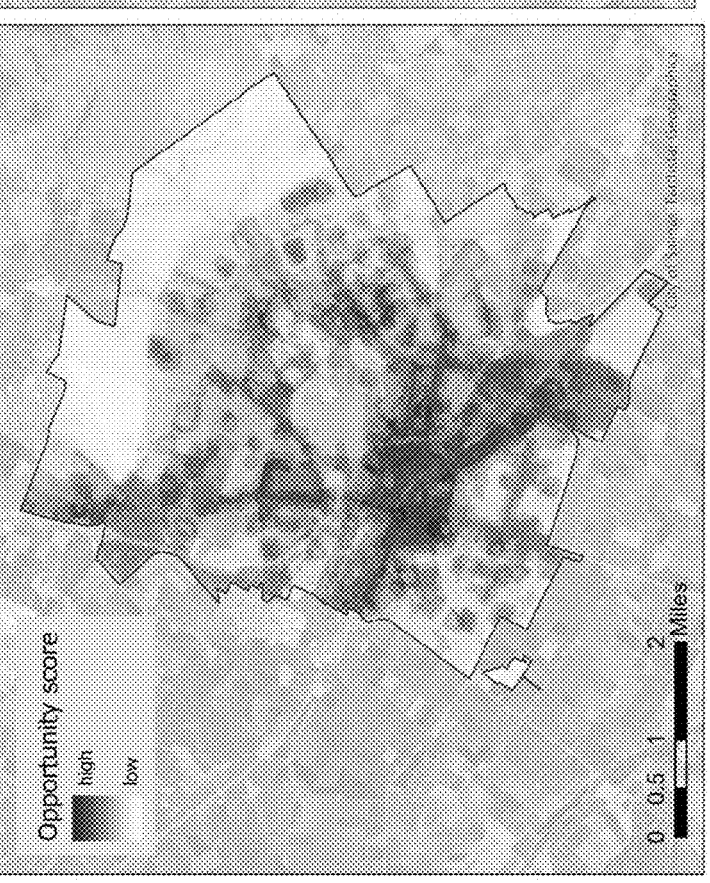

In several embodiments of the invention, the initial output map can be displayed on a user interface, in response to which a user may adjust at least one of the model structure 136 or weights 134. A revised output map can be generated based on the revised specifications. These adjustment and revisions can be performed multiple times to generate a final output map 150. An example of an opportunity map 310, or an output map with opportunity scores, is shown in FIG. 3. In certain embodiments of the invention, benefit scores are combined into opportunity scores independently of any output map. Users may similarly refine specifications to generate a final set of opportunity scores.

Figure 4:
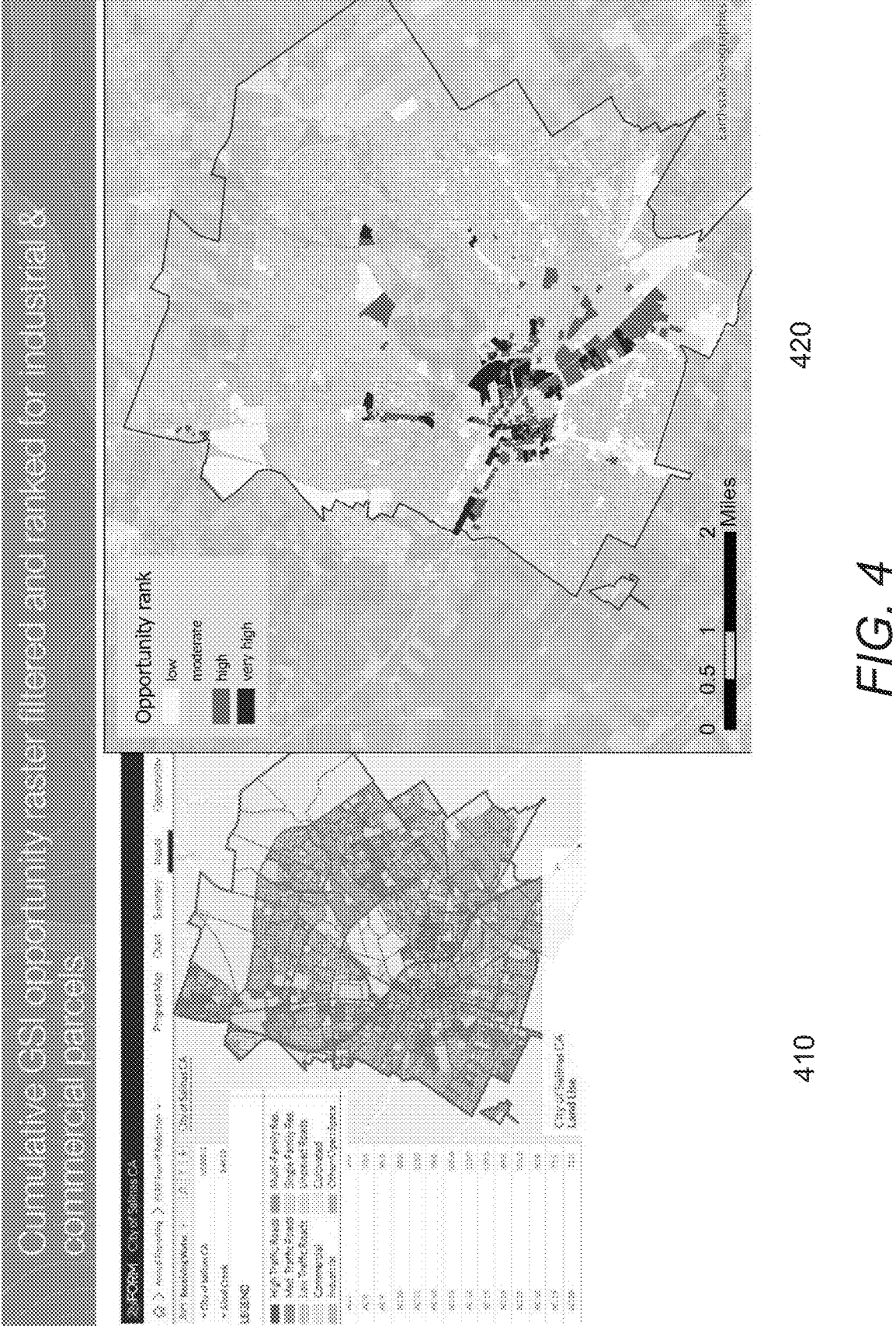
FIG. 4 shows an opportunity map filtered for industrial and commercial parcels in accordance with an embodiment of the invention.

In some embodiments, an opportunity map can be joined with other data layers, such as but not limited to those with parcel or road segment data, to generate, for example, a parcel-based map 320 such as that shown in FIG. 3. Various logistical or procedural filters can also be applied to an opportunity map in accordance with many embodiments of the invention. As an example, the opportunity map 420 in FIG. 4 is filtered for commercial and industrial parcels 410. In some embodiments of the invention, properties may be ranked 152 and/or filtered 154 by certain characteristics, such as but not limited to amount of impervious area, to result in rankings within a specific portfolio of properties based on each property's relative opportunity to provide benefits. The resulting ranked set of properties can be displayed in a final priority map 160.

Stormwater Project Identification Methods

In accordance with many embodiments of the invention, a method identifies locations for implementation of stormwater management measures, so as to maximize multiple environmental and community benefits including but not limited to at least one of runoff reductions, water quality improvements, urban greening, community enhancement, natural habitat protection, water supply resilience, flood risk protection, urban temperature reductions, or climate change mitigation. In some embodiments of the invention, the implementation of a stormwater project identification method is either web-based or computer-based. In some embodiments, stormwater implementation projects include features that provide at least one of stormwater infiltration, treatment, or increased urban green space. Examples of some of these projects include but are not limited to bioretention features, infiltration basins, constructed wetlands, green roofs, and urban tree stands.

Data Rasterization and Benefit Scores

In many embodiments of the invention, spatial data are gathered to characterize urban landscape opportunities and logistical constraints for implementation of projects to mitigate environmental impacts of stormwater runoff. Some of these spatial data may be publicly available, and others administered by local agencies such as at the city or county levels.

Spatial data can include, but are not limited to, at least one of parcel layers, soils data, groundwater basin locations, local flooding risks, urban pollutant loading, community demographics, urban greenness indicators, locations of existing stormwater infrastructure, or one of various logistical constraints. Spatial data may be of different types such as but not limited to points, lines, polygons, and raster (gridded) data. In some embodiments of the invention, the spatial data are rasterized by, for example but not by way of limitation, combining on a uniform square grid of a certain distance, such as but not limited to 30 meters, with all data types turned into raster data with values representing density or proportional coverage of points, lines, and polygons within each grid cell, such as but not limited to using the rasterization methods identified in the benefit category charts below. Length-weighted averages may be calculated for multiple lines, and area-weighted averages may be calculated for multiple polygons. The rasterization process turns the vector data into a raster image or set of gridded pixels with values that reflect the underlying vector data.

In many embodiments of the invention, the raster data are defined on different scales, so they are normalized by calculating percentile values for each to put them all on a common scale of 0-100. Data layers can be normalized, for example, using the formula $x_n=(x-x_{min})/(xmax-x_{min})*100$, where $x_n$ is the normalized value of any given value (x), $x_{min}$ is the minimum value of the data set, and $x_{max}$ is the maximum value of the data set.

In some embodiments of the invention, a subset of the normalized raster data is synthesized into a new data layer to represent, for example, the potential for achieving a particular benefit. As an example, the potential benefit of improving water quality conditions may depend on the estimated stormwater pollution generated from an area. The more severe the water quality impacts are in a specific area, the greater the benefit may be realized from water quality treatment. One approach to decreasing stormwater pollution is the elimination of road material via street sweeping. The greater the accumulation rate of pollutant-laden material on roadways, the higher the payoff from implementing street sweeping efficiency improvements. However, the effectiveness can be limited by the condition of the roads. If the roads in a region have sustained notable damage, such as but not limited to cracks and potholes, street sweeping machines may not effectively remove materials that have fallen into damaged areas of the roads. Thus, it may be desirable to join a data layer representing the amount of pollutant-laden material with a data layer representing road damage, to synthesize a new data layer representing the potential benefit, or opportunity to decrease road material accumulation.

Newly synthesized data layers can be represented as benefit maps, such as those shown in FIG. 2, and/or combined with other synthesized or individual data layers to form benefit maps. In many embodiments of the invention, a benefit map includes a benefit score calculated based on a combination of scores for individual data layers chosen for the corresponding benefit category. The calculation is based on the distribution of values and the number of metrics being used for each benefit map. Benefit maps can thus provide information to the user regarding the initial weighting of factors for generation of the initial output map.

A property benefit score is defined as a metric showing the relative opportunity for benefits delivered to local communities through property-scale stormwater mitigation. As an example and not by way of limitation, each category may employ a 0-100 scale, with a higher property benefit score indicating a higher environmental opportunity, as shown in FIGS. 2.1-2.2.

As an example and not by way of limitation, using data from publicly available national datasets, rasterization using geospatial analytical methods can be applied to calculate potential benefits of stormwater projects for each of various benefit categories, such as but not limited to the following:

a) Water quality: Decrease urban stormwater pollution based on the expected pollution generation from the property, hydrologic connectivity to receiving waters, and the level of impairment of the downstream water resources.

b) Water supply: Manage stormwater as a supply resource through increasing the capture of stormwater for infiltration in groundwater recharge zones and/or diversion to capture-and-reuse projects.

c) Flood reduction: Reduce peak stormwater flows from current and future extreme precipitation events, with particular attention to local flood prone areas.

d) Community uplift: Deliver environmental and community benefits to vulnerable neighborhoods based on the social vulnerability of the local population, need for greater green infrastructure, and exposure to urban heat island effects.

In accordance with certain embodiments of the invention, the implementation details of stormwater project identification may be selected to provide consistent, intuitive, and understandable results to develop stormwater projects. The charts below outline the specific layers, methods and weighting chosen for each project benefit category in this example implementation.

| Water Quality | | | |
| --- | --- | --- | --- |
| Metric (data layer) | Weight | Example Data source | Rasterization methods |
| Baseline pollution loading | 0.33 | Tool to Estimate Load Reductions (TELR) baseline particulate loading-2NDNATURE Software Inc. | Raw value |
| Drainage distance to impaired waterbody | 0.33 | 303(d) listing-U.S. Environmental Protection Agency (EPA); Watershed Boundaries-U.S. Geological Survey (USGS) | Index based on smallest watershed unit that contains an impaired waterbody: HUC12 = 1, HUC10 = 0.67, HUC8 = 0.33, others = 0 |
| Industrial water pollution risk | 0.33 | EJScreen environmental indicators-EPA | Combination of 4 indices: Proximity to NPL (Superfund) sites, Proximity to Risk Management Plan (RMP) facilities , Proximity to hazardous waste sites, Wastewater discharge |

| Flood Hazard | | | |
| --- | --- | --- | --- |
| Metric (data layer) | Weight | Example Data source | Rasterization methods |
| Flood hazard area | 0.33 | Flood hazard areas-Federal Emergency Management Agency (FEMA) | Classified based on % annual chance of flooding |
| Percent of annual precipitation falling in extreme events | 0.33 | PRISM Climate Group | % of annual rainfall above the $99^{th}$ percentile (81-2018) |
| Projected change in extreme precipitation events | 0.33 | Global climate change projections-Coupled Model Intercomparison Project (CMIP5) | Projected change in the $99^{th}$ percentile event depth (2035-2050) |

| Community Uplift | | | |
|---|---|---|---|
| Metric (data layer) | Weight | Example Data source | Rasterization methods |
| Socioeconomic status | 0.33 | Social Vulnerability Index-Centers for Disease Control and Prevention (CDC) | Raw value |
| Current greenness level | 0.33 | Landsat Normalized Difference Vegetation Index (NDVI)-National Aeronautics and Space Administration (NASA)/USGS | 5 year mean of $90^{th}$ percentile annual NDVI. 300 m moving window mean to get neighborhood scale greenness |
| Urban heat island condition | 0.33 | Surface Urban Heat Islands-Yale Center for Earth Observation (YCEO) | Mean day & night UHI intensity (degrees) 2003-18 |

| Water Supply | | | |
|---|---|---|---|
| Metric (data layer) | Weight | Example Data source | Rasterization methods |
| Baseline stormwater runoff volume | 0.33 | TELR baseline runoff-2NDNATURE Software Inc. | Raw value |
| Drought risk | 0.33 | Annualized Frequency of Droughts-FEMA | Raw value |
| Soil permeability | 0.17 | Hydrologic soil type-Gridded National Soil Survey Geographic Database (gNATSGO), Natural Resources Conservation Service (NRCS) | Index based on soil type: A = 1, B = 0.67, C = 0.33, D = 0 |
| Above groundwater aquifer | 0.17 | Principal Aquifers-USGS | Index based on aquifer location: above an aquifer = 1, other = 0 |

In a number of embodiments of the invention, data for each layer is available across a particular geographic region or country, such as but not limited to the United States. Each metric is chosen for its direct relationship to the expected benefits within its category, and provides unique information to the overall analysis. Using various rasterization methods, such as but not limited to those described above, raw values or derived indices are extracted from each layer and appended to the property polygons. The values are then normalized so that each metric has the same range of 0-100, with higher values indicating greater potential benefit. Various weightings can then be used to combine the metrics into a single property benefit score of 0-100 for each category. In the above example, equal weightings are largely used, except with respect to capacity for infiltration ("soil permeability") and aquifer location ("above groundwater aquifer"), which combine to form a metric indicating likelihood of groundwater recharge.

"Baseline" metrics such as "stormwater runoff volume" and "pollution loading" as indicated in the charts above refer to modelled stormwater runoff volumes and particulate loads that would reach the receiving water if no BMPs were in place. These baseline estimates may be calculated automatically during the user onboarding process using publicly-available datasets. In some embodiments of the invention, these calculated baseline values will only change if the Municipal Separate Storm Sewer System (MS4) boundary or land use changes.

In a number of embodiments of the invention, a hydrologic model that simulates hydrologic systems is used for calculating the baseline values. A hydrologic system includes various components associated with a water cycle, such as but not limited to the processes of precipitation, evaporation, transpiration, condensation, infiltration, groundwater flow, streamflow and runoff, in addition to structures and devices for managing the system. Hydrologic models can be used to predict various characteristics of hydrologic systems, such as but not limited to runoff responses and pollutant loading to streams.

As an example, one such hydrologic model is the Stormwater Tool to Estimate Load Reductions (TELR or swTELR), which determines runoff and particulate loads using four inputs: 35-year historical rainfall (e.g., from PRISM Climate Group), percent imperviousness (e.g., from National Land Cover Database (NLCD)), hydrologic soil group (e.g., from NRCS Soil Survey Geographic Database (SSURGO)), and local land use. The TELR model is an urban runoff model designed to quantify runoff reduction benefits of mitigation actions, and is further described in N. Beck et al., 2017, "An urban runoff model designed to inform stormwater management decisions" *Journal of Environmental Management*, Vol. 193, pp. 257-269, the disclosure of which is herein incorporated by reference in its entirety.

It is to be understood that any sources for data listed are provided as examples, and that one or more of a variety of other sources that provide data appropriate for use in calculating benefit scores may be used alternatively or additionally.

Opportunity Maps and Scores

Benefit maps and scores can be combined into opportunity maps and scores, respectively, to facilitate a reliable and defensible nationwide screening to immediately return the relative multi-benefit opportunity of a portfolio of properties. In many embodiments of the invention, user-defined weightings and filters allow users to determine the relative importance of each benefit category and each property type/location to best meet their ESG goals. The resulting opportunity score can be used to rank each property within a specific portfolio of properties based on the property's relative opportunity to provide benefits.

According to several embodiments of the invention, the normalized raster data layers (individual, synthesized or both) are combined to identify locations that maximize the benefits associated with stormwater implementation projects. Data layers can be combined in different ways, based on for example raster model structure, and using different weights for each data layer, based on for example raster model coefficients. At least one of these components of the raster model can be pre-determined, based on default specifications, or specified by a user. The user can select a structure or weights, for example, via a user interface that is web-based or computer-based. Model structural choices can include but are not limited to linear combinations of all layers with their associated coefficients, and a decision tree model, which performs an initial filtering of options based on one or more of the data layers before combining them. In some embodiments, users also specify the threshold values associated with decision tree data layers and the weighting coefficients assigned to each data layer that is combined with other layers.

In accordance with many embodiments of the invention, initial outputs from the raster model are displayed in a user interface using thematic maps, such as but not limited to the opportunity maps shown in FIG. 3, that highlight parcels and road segments that maximize the benefits associated with stormwater implementation projects. This map describes the level of opportunity relative to the prioritized stormwater benefits and model structure specified either by default or by the user. As an example and not by way of limitation, an initial opportunity map can be generated by default using a linear combination of all benefit categories weighted equally.

In many embodiments of the invention, users have the opportunity to return to the interface to control the final analysis in various ways, such as but not limited to refining the raster model coefficient weights or raster model structure. Users may define the weighting for each category as they are combined to create a single multi-benefit (or opportunity) score, enabling prioritizing certain benefits over others. Users may revise the weights or structure based on, for example, comparison of the outputs with other information or expert knowledge to gauge the accuracy of the map.

In certain embodiments, the same process of generating a combined raster output previously described is repeated. This process can be iterated as many times as necessary until users arrive at a final output map to describe locations with the greatest stormwater multi-benefit opportunities, or to their satisfaction. In many embodiments, a single opportunity score for a given site within a region represents the opportunity for improvement via implementing stormwater measures, given the prioritization of potential benefits specified by the user. Thus, focusing projects on the sites with the highest opportunity scores in a region will maximize efforts within that region toward reaching the community's desired goals.

Additionally or alternatively, users may decide whether to rank and/or filter areas defined by one or more of various spatial polygons serving as units of analysis, such as but not limited to property boundaries, watersheds, congressional districts, and municipal boundaries, based on certain characteristics. For example, a certain property could be ranked higher based on its amount of impervious surface, recognizing that larger impervious areas should create a greater opportunity for mitigating stormwater impacts. As an example and not by way of limitation, a ranking for impervious surface could be calculated using the formula $n=(P/100)\times N$, where P=percentile, N=number of values in a data set (sorted from smallest to largest), and n=ordinal rank of a given value. In some embodiments of the invention, the ranking and/or filtering may be performed by adjusting respective opportunity scores so as to result in an updated opportunity score for each property. Alternatively, the properties keep their opportunity scores as calculated in the final output map, and are additionally given a separate ranking based on the ranking and/or filtering.

In other embodiments of the invention, filtering of the outputs may employ the use of spatial data layers. In a number of embodiments of the invention, the combined raster data (opportunity score layer) are spatially joined with parcel and road data layers, so that each parcel or road segment polygon takes on an average value based on proportional coverage of the grid cells which were output from the raster model. An example of an opportunity map with parcel and road layers joined is shown as map 320 in FIG. 3. For example, a parcel assessor's data layer showing legal boundaries can be joined to the raster grid cells (such as in map 310 of FIG. 3). The raster data can be converted to vector data representing the parcels and road segments, which can be displayed on the map using various colors representing opportunity score scale ranges. In some embodiments, users may click on the road segments and parcels in the map, to view further details about those portions, such as but not limited to contributions of the multi-benefits, weightings, corresponding interim maps, attributes of the portions, and suggestions for stormwater management.

In several embodiments of the invention, filtering is performed based on logistical or procedural specifications. FIG. 4 shows an example of an opportunity map 420 filtered to show only industrial and commercial parcels 410. Filters can be based on categories such as but not limited to land use (e.g., residential or commercial) or parcel ownership (e.g., public or private ownership). Filters can also be based on particular specifications such as but not limited to the size of a right of way, which may for example indicate sufficient space for a certain project, or the distance to existing stormwater infrastructure, if for example a new project requires a connection to an existing pipe. In addition, the user may use filter options to specify that the opportunity map display only parcels with certain attributes, such as but not limited to those associated with location or lessee.

In some embodiments of the invention, before and/or after filtering for certain attributes, opportunity rankings are applied to various portions, such as parcels, of the mapped region to indicate their opportunity scores as compared to other areas of the region. For example, properties may be ranked relative to the other properties in a particular analysis. The rankings can allow users to efficiently select properties into a stormwater resiliency plan that is effective and cost-efficient.

It is to be understood that combinations of one or more of various methods of filtering or ranking may be used along with various units of analysis and/or attributes, and are not limited to those described herein. With respect to at least one or more of the methods described above for identifying stormwater mitigation opportunities, including but not limited to those for scoring, ranking and filtering properties or other areas, it is to be understood that multiple iterations may be performed with user adjustments.

In some embodiments, interim maps, such as but not limited to the benefit maps shown in FIG. 2, can be saved by users and viewed alongside the input datasets to facilitate comparison of multiple scenarios with different coefficient weights or raster model structures. This can potentially aid users in understanding the sensitivity and prioritization consequences of these decisions in the final output maps. In certain embodiments of the invention, users may click on portions of opportunity maps to view details about those portions. Those details may include, for example, corresponding portions of interim maps, the weights specified for benefit categories, the contribution of each benefit category to the overall opportunity score, the selected model structure, recommended stormwater management projects, and input data. Project recommendations can include but are not limited to bioretention features, treatment vaults, constructed wetlands, and infiltration basins.

As an example, if a particular parcel is located next to a body of water impaired with high metal concentration, and the user weighted water quality strongly, the opportunity map would likely show a high opportunity score for that parcel. This is because there exists a relatively greater opportunity for improvement to the low water quality in that parcel as compared to other parcels in the region. Likewise, an interim benefit map illustrating benefit scores for opportunities to improve water quality would show a relatively high benefit score for that parcel. In certain embodiments of the invention, the opportunity and/or interim maps allow the user to access further details about specific parcels, and may provide suggestions for stormwater management measures in alignment with the user's specified goals (i.e., weighted benefits).

Graphics can be used to show key economic, environmental, and social performance indicators for individual properties relative to a portfolio of properties. As an example, FIG. 2.2 shows benefit scores for four categories, where the property range indicates the range of scores for properties within a given organization's portfolio, and the property average indicates the average of scores for the portfolio's properties. Indications such as but not limited to labels or graphic symbols may be used to identify certain designations of properties, such as but not limited to a symbol for those located in environmental justice communities. Properties that are not selected for the plan may be returned to the property portfolio for potential later treatment, or shelved as unsuitable for stormwater projects.

The methods and systems in accordance with many embodiments of the invention provide an efficient way to prioritize stormwater resiliency investments across properties. Optionally, another step in building an ESG stormwater plan is to determine which properties should be prioritized for engineering feasibility studies, which ones can be shelved, and what the expected impacts will be. As further information is gathered and refined, the information can be stored within a stormwater projects identification system, creating a single reference database for all stormwater projects. In addition, other modules can be integrated to allow tracking of the projects and assets as they are designed, built, and managed.

Although stormwater project identification methods are described above with respect to FIGS. 1-4, other configurations may be utilized appropriate to the requirements of a specific application in accordance with various embodiments of the invention.

Stormwater Project Identification Systems

FIGS. 5-8 illustrate examples of a stormwater project identification system according to some embodiments of the invention. The stormwater project identification system may include a computing system that is web-based or locally run, and may or may not also include or access other devices such as but not limited to a user device or a display device.

Figure 5:
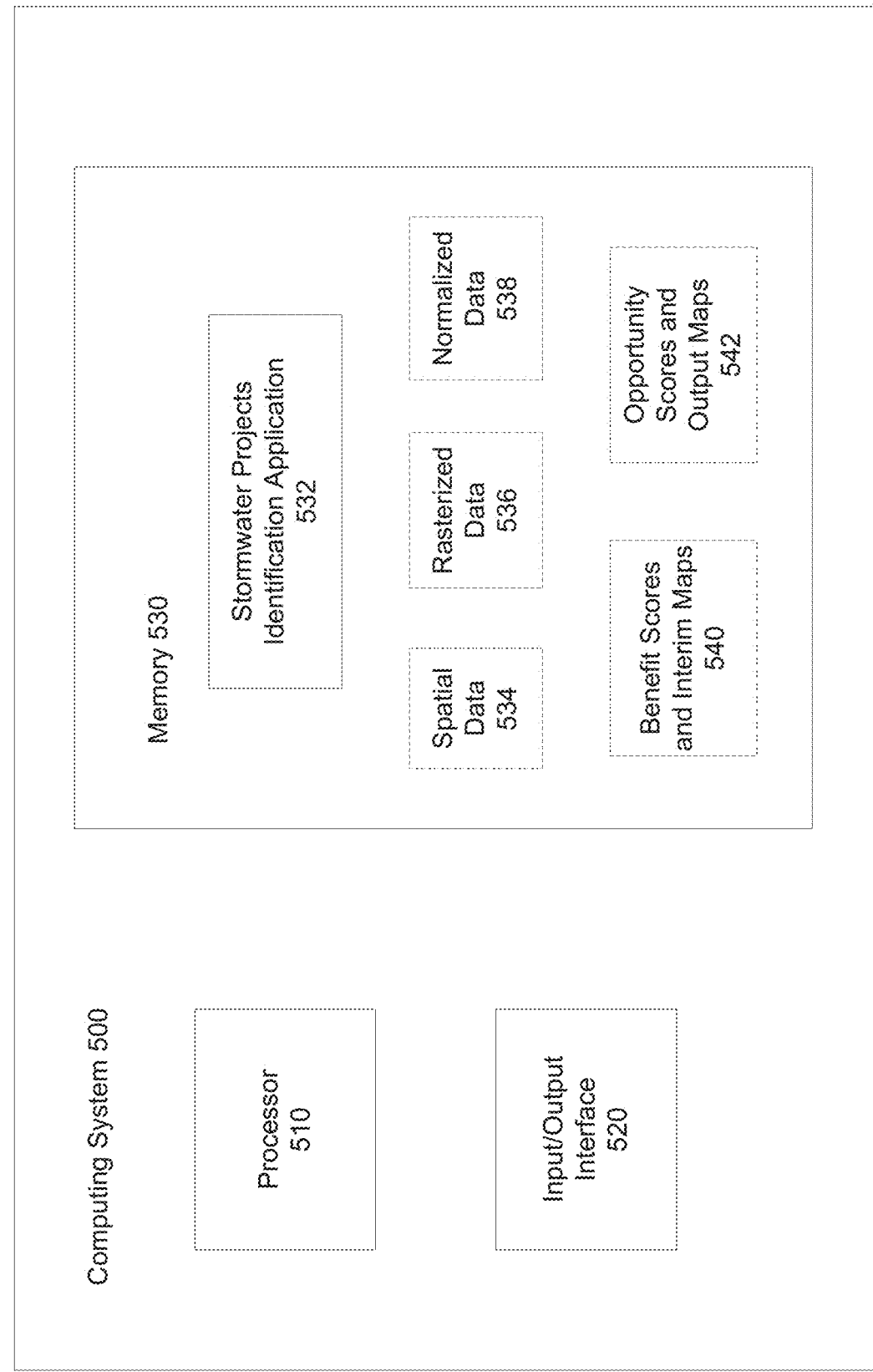
FIG. 5 is a block diagram illustrating a system for identifying stormwater management opportunities in accordance with an embodiment of the invention.

In many embodiments of the invention, a computing system 500 may store a stormwater project identification application for performing one of various methods as described above. The computing system may be implemented on a single computing device in accordance with some embodiments of the invention, as shown in FIG. 5. The computing system may be a web server, personal computer, a laptop computer, a mobile device, and/or any other computing device with sufficient processing power for the processes described herein. The computing system includes a processor 510, which may refer to one or more devices within the computing device that can be configured to perform computations via machine readable instructions stored within a memory 530 of the computing system.

The processor may include one or more microprocessors (CPUs), one or more graphics processing units (GPUs), and/or one or more digital signal processors (DSPs). According to other embodiments of the invention, the computing system may be implemented on multiple computers.

The memory may contain a stormwater project identification application 532 that performs processes such as those described above. It may also store data for use in or subsequent to performing the processes, such as but not limited to spatial data 534, rasterized data 536, normalized data 538, benefit scores and interim maps 540, and opportunity scores and output maps 542.

Figure 6:
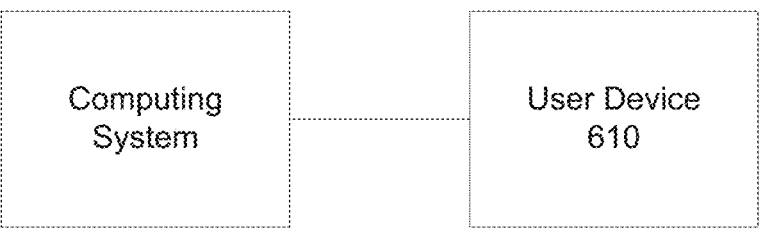
FIG. 6 is a block diagram illustrating a system for identifying stormwater management opportunities with access to a user device in accordance with an embodiment of the invention.
Figure 7:
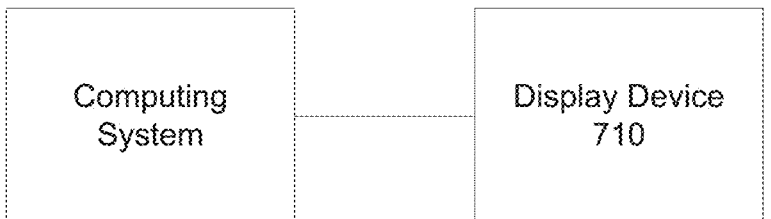
FIG. 7 is a block diagram illustrating a system for identifying stormwater management opportunities with access to a display device in accordance with an embodiment of the invention.

In some embodiments of the invention, the computing system may include an input/output interface 520 that can be utilized to communicate, directly or indirectly, in a wired or wireless manner with a variety of devices, including but not limited to a display device 610 as shown in FIG. 6 or a user device 710 as shown in FIG. 7. A user device may include, for example but not by way of limitation, one or more of a display or user interface through which user input may be received. As can be readily appreciated, a variety of software architectures can be utilized to implement a computing system in accordance with several embodiments of the invention.

Figure 8:
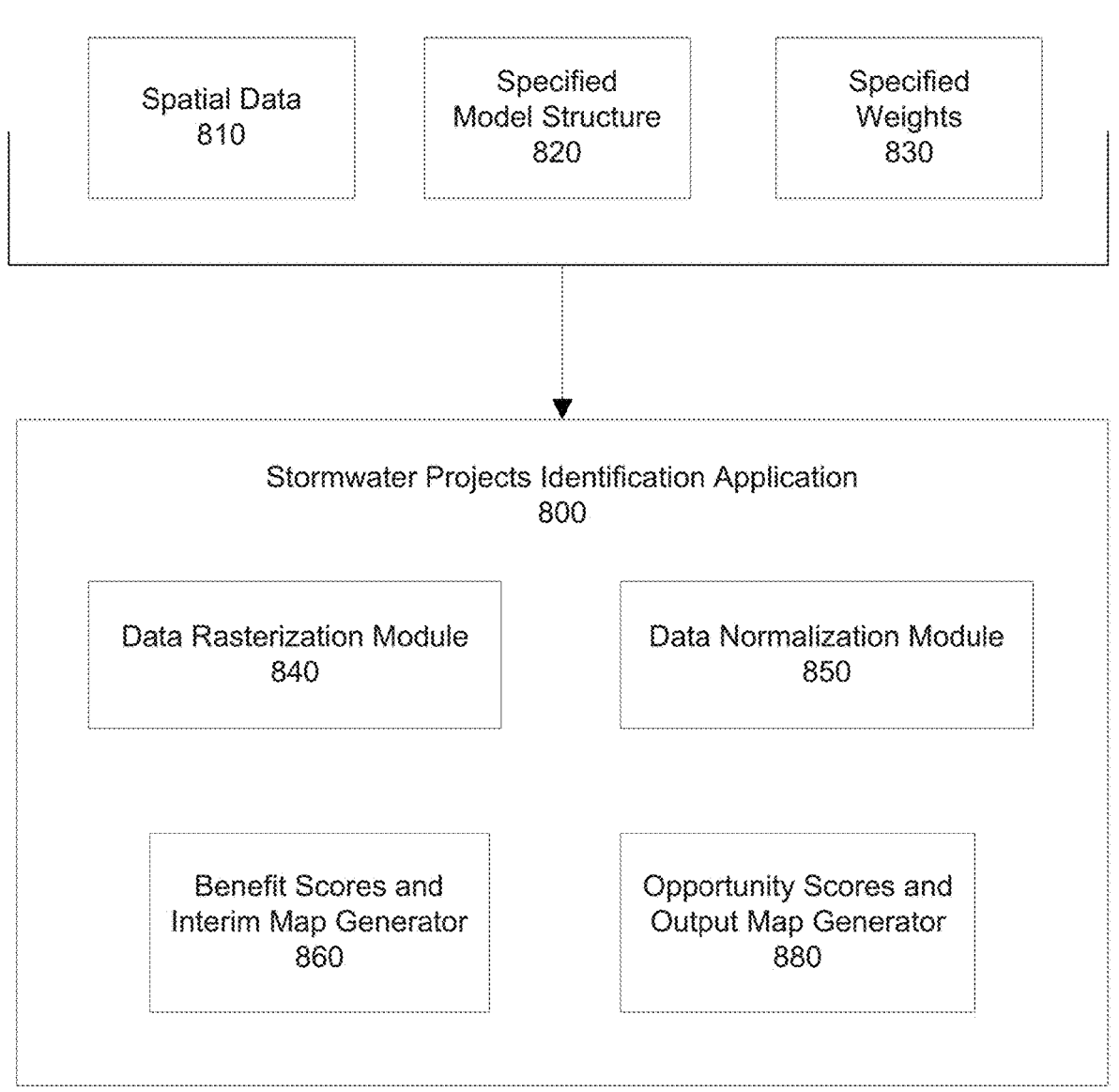
FIG. 8 is a block diagram illustrating a stormwater projects identification application in accordance with an embodiment of the invention.

FIG. 8 illustrates an example of a stormwater projects identification application 800 in accordance with many embodiments of the invention. Spatial data 810 is input into the stormwater projects identification application, along with any model structure 820 or weights 830 specified by, for example, the user. The application may include a data rasterization module 840 that rasterizes the spatial data and a data normalization module 850 that normalizes the data. The application may include a benefit scores and interim map generator 860 that uses subsets of data layers to form interim benefit maps. An opportunity scores and output map generator 880 may use the received model structure and/or weights to combine subsets of the interim maps to generate output maps. These modules within the application may be combined or separated in various implementations according to several embodiments of the invention.

Although stormwater project identification systems are described above with respect to FIGS. 5-8, other configurations may be utilized appropriate to the requirements of a specific application in accordance with various embodiments of the invention.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for identifying stormwater management opportunities, comprising:

gathering spatial data for a region;

rasterizing the spatial data into a set of raster data layers;

forming a plurality of benefit maps of the region using subsets of the set of raster data layers, wherein the plurality of benefit maps corresponds to a plurality of benefit categories, wherein each benefit map indicates an opportunity for improvement in the corresponding plurality of benefit categories for the region;

generating an opportunity map by combining a subset of the plurality of benefit maps using a set of weights where each of the set of weights assigns a relative importance to one of the subset of the plurality of benefit maps, wherein the opportunity map includes an opportunity score for a portion of the region that indicates an estimated potential for achieving the benefits of the subset of benefit maps if stormwater management projects are implemented; and displaying the opportunity map on a user interface.

2. The method of claim 1, further comprising:

normalizing the set of raster data layers.

3. The method of claim 1, wherein the spatial data includes data of at least one data type selected from the group consisting of vector data and raster data.

4. The method of claim 1, wherein the spatial data relates to at least one data category selected from the group consisting of stormwater pollution, drainage distance to impaired waterbody, water pollution risk, trash priority land use area, stormwater runoff, drought risk, groundwater basin, soil infiltration capacity, hydrologic soil type, area of imperviousness, local flooding frequency, historical precipitation, projected change in precipitation, biodiversity, urban heat island condition, current greenness level, community socioeconomic status, park proximity, and public exposure.

5. The method of claim 1, wherein the plurality of benefit categories includes at least one benefit category selected from the group consisting of runoff reductions, water quality improvements, urban greening, community enhancement, natural habitat protection, water supply resilience, flood risk protection, urban temperature reductions, and climate change mitigation.

6. The method of claim 1, wherein the weights are specified by a user.

7. The method of claim 1, further comprising:

synthesizing multiple raster data layers from the set of raster data layers to form a synthesized raster data layer; and adding the synthesized raster data layer to the set of raster data layers.

8. The method of claim 1, wherein generating the opportunity map is further performed by combining the subset of the plurality of benefit maps using a model structure.

9. The method of claim 8, wherein the model structure is specified by a user.

10. The method of claim 1, wherein generating the opportunity map is further performed by joining the combined subset of the plurality of benefit maps with at least one supplemental data layer selected from the group consisting of a parcel data layer and a road data layer.

11. A system for identifying stormwater management opportunities, comprising:

a processor; and a memory containing an application for identifying stormwater management opportunities, wherein execution of the application directs the processor to:

gather spatial data for a region;

rasterize the spatial data into a set of raster data layers;

form a plurality of benefit maps of the region using subsets of the set of raster data layers, wherein the plurality of benefit maps corresponds to a plurality of benefit categories, wherein each benefit map indicates an opportunity for improvement in the corresponding plurality of benefit categories for the region;

generate an opportunity map by combining a subset of the plurality of benefit maps using a set of weights where each of the set of weights assigns a relative importance to one of the subset of the plurality of benefit maps, wherein the opportunity map includes an opportunity score for a portion of the region that indicates an estimated potential for achieving the benefits of the subset of benefit maps if stormwater management projects are implemented; and display the opportunity map on a user interface.

12. The system of claim 11, wherein execution of the application further directs the processor to:

normalize the set of raster data layers.

13. The system of claim 11, wherein the spatial data includes data of at least one data type selected from the group consisting of vector data and raster data.

14. The system of claim 11, wherein the spatial data relates to at least one data category selected from the group consisting of stormwater pollution, drainage distance to impaired waterbody, water pollution risk, trash priority land use area, stormwater runoff, drought risk, groundwater basin, soil infiltration capacity, hydrologic soil type, area of imperviousness, local flooding frequency, historical precipitation, projected change in precipitation, biodiversity, urban heat island condition, current greenness level, community socioeconomic status, park proximity, and public exposure.

15. The system of claim 11, wherein the plurality of benefit categories includes at least one benefit category selected from the group consisting of runoff reductions, water quality improvements, urban greening, community enhancement, natural habitat protection, water supply resilience, flood risk protection, urban temperature reductions, and climate change mitigation.

16. The system of claim 11, wherein the weights are specified by a user.

17. The system of claim 11, wherein execution of the application further directs the processor to:

synthesize multiple raster data layers from the set of raster data layers to form a synthesized raster data layer; and add the synthesized raster data layer to the set of raster data layers.

18. The system of claim 11, wherein generating the opportunity map is further performed by combining the subset of the plurality of benefit maps using a model structure.

19. The system of claim 18, wherein the model structure is specified by a user.

20. The system of claim 11, wherein generating the opportunity map is further performed by joining the combined subset of the plurality of benefit maps with at least one supplemental data layer selected from the group consisting of a parcel data layer and a road data layer.

21. The method of claim 1, wherein the opportunity map provides a ranking of portions of the region based on the opportunity score for each portion of the region.

22. The system of claim 11, wherein the opportunity map provides a ranking of portions of the region based on the opportunity score for each portion of the region.

\* \* \* \* \*